Figure 1:
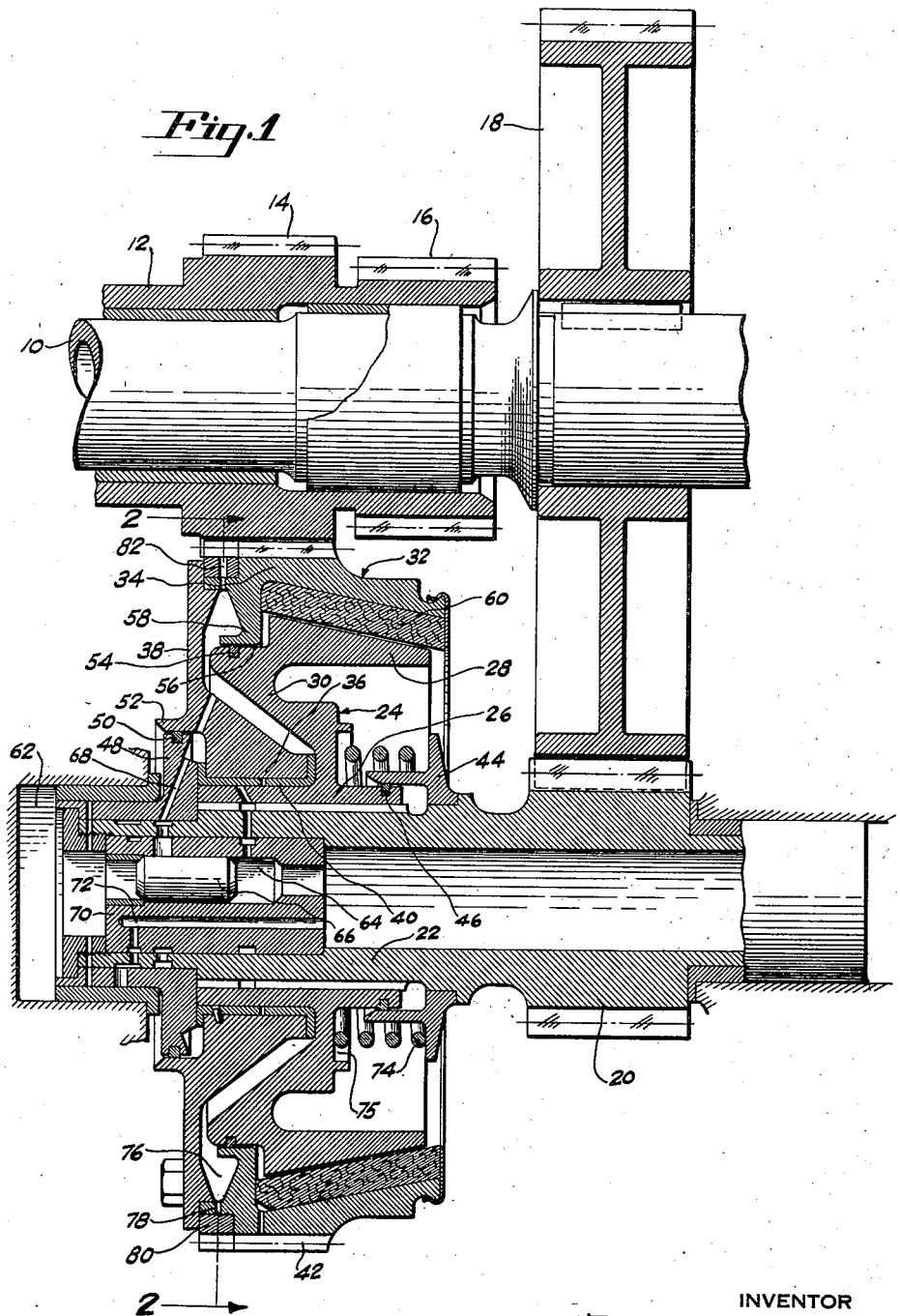

Sept. 21, 1943.                G. E. BEARDSLEY, JR                2,330,024
                                DESLUDGING MECHANISM
                              Filed Jan. 15, 1942          2 Sheets-Sheet 2

INVENTOR
Guy E. Beardsley, Jr.
BY
Harris G. Luther
ATTORNEY

Patented Sept. 21, 1943

2,330,024

UNITED STATES PATENT OFFICE 2,330,024

DESLUDGING MECHANISM

Guy E. Beardsley, Jr., West Hartford, Conn., assignor to United Aircraft Corporation, East Hartford, Conn., a corporation of Delaware Application January 15, 1942, Serial No. 426,900

12 Claims. (Cl. 192—85)

This invention relates to improvements in fluid operated clutch devices and particularly to a clutch device adapted to utilize a fluid such as engine lubricating oil for its operating fluid.

An object of the invention resides in the provision in a clutch device of the character indicated of means for eliminating sludge or sediment from the clutch actuating fluid chamber.

A further object resides in the provision, in a fluid actuated clutch of the character indicated, of means for effectively and completely eliminating sludge or sediment from the interior of the clutch mechanism without at the same time incurring an unduly large leakage of clutch actuating fluid.

A more specific object resides in the provision in a fluid actuated clutch of the character indicated of a large number of apertures for passing sludge or sediment coagulated by centrifugal action in the clutch from the clutch interior together with means for maintaining these apertures closed to prevent undue leakage of clutch operating fluid, except for brief intervals during which the various apertures are opened in sequence to permit them to discharge any accumulation of sediment or sludge deposited in their respective vicinities.

Other objects and advantages will be more particularly pointed out hereinafter or will become apparent as the description proceeds.

In the accompanying drawings, in which like reference numerals are utilized to designate similar parts throughout, there is illustrated a suitable mechanical embodiment for the purpose of disclosing the invention. The drawings, however, are for the purpose of illustration only and are not to be taken as limiting or restricting the invention since it will be apparent to those skilled in the art that various changes in the illustrated arrangement may be resorted to without in any way exceeding the scope of the invention.

Figure 2:
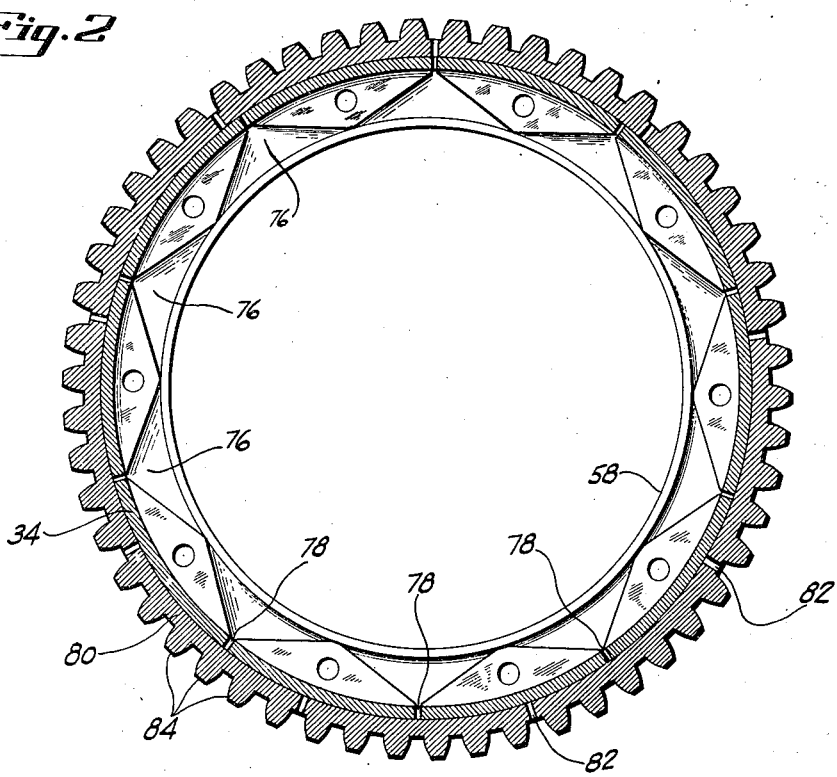

In the accompanying drawings,

Fig. 1 is a diametrical sectional view through a clutch constructed according to the invention, showing the application thereto of sludge eliminating means constructed according to the invention, and Fig. 2 is a transverse sectional view on the line 2—2 of Fig. 1.

Fluid operated clutches are now being used in connection with internal-combustion engines for various purposes such as for providing change speed gear drives for the superchargers of aircraft engines, and for various other purposes. It has been found convenient to operate such clutches by the engine lubricating oil since the engine lubricating system provides a convenient source of fluid under pressure for this purpose and the use of this source of fluid pressure obviates the necessity of the additional weight and complication which would be involved in providing a separate clutch operating fluid system. It has been found, however, that the engine lubricating oil frequently contains a considerable amount of sludge or sediment which the clutch tends to separate out by centrifugal action and which then tends to accumulate in the interior of the clutch interfering with the smooth operation thereof and eventually rendering the clutch inoperative if the sludge is not effectively eliminated.

A fluid operated clutch with sludge eliminating features is illustrated and described in United States Patent Number 2,258,463, issued October 7, 1941, to Veon I. Moncrieff for desludging device. The present invention is an improvement upon the mechanism disclosed in this patent. Use of fluid clutches of the character disclosed in United States Patent Number 2,258,463 has indicated that a large number of sludge eliminating apertures at the apices of steep walled radial pockets are necessary to completely and rapidly eliminate the sludge or sediment from the interior of the clutch. It has been found, however, that it is not necessary that the apertures should be continuously open as long as they are opened for brief periods of reasonably frequent intervals.

In the accompanying drawings, the numeral 10 indicates a power shaft, such as the impeller drive shaft of a supercharger for an internal-combustion aircraft engine. This shaft extends through a sleeve 12 which carries the supercharger impeller, not illustrated, and also a plurality of gears, as indicated at 14 and 16, of different diameters. The drive shaft 10 projects beyond the sleeve 12 and carries a spur gear 18 which meshes with a spur gear 20 formed integrally with or rigidly secured to a lay shaft 22 having its axis parallel to the axis of the shaft 10. An inner clutch member, generally indicated at 24, having a cylindrical hub portion 26 and a beveled rim portion 28 secured to the hub portion 26 by an annular intermediate portion 30, is splined to the lay shaft 22 and rotates therewith, the spline connection being such that the member 24 is movable axially of the shaft to an extent sufficient to engage and disengage the clutch. An outer clutch member, generally indicated at 32, has an interiorly beveled rim portion 34 secured to a cylindrical hub portion 36 by an annular end wall 38 and the hub portion 36 is supported upon the overlapping portion of the hub 26 of the inner clutch member 24 by a suitable plain anti-friction bearing 40 so that the outer clutch member 32 is freely rotatable relative to the inner clutch member and the lay shaft 22. The outer clutch member 32 is also provided with peripheral gear teeth 42 which mesh with the teeth of the gear 14 to provide a driving connection between the power shaft 10 and the impeller sleeve 12 through the gears 18 and 20, the inner and outer clutch members 24 and 32 and the gears 42 and 14. A similar clutch unit may be provided driven by the gear 18 and meshing with the gear 16 to provide a different gear ratio between the shaft 10 and the sleeve 12.

A fluid seal between the inner clutch member 24 and the shaft 22 is provided by the annular member 44 and the seal ring 46 and a somewhat similar fluid seal is provided between the outer clutch member 32 and the shaft 22 by the annular member 48 and the seal ring 50 bearing against the interior of an annular extension 52 provided on the end wall of the outer member. A fluid seal between the two clutch members 24 and 32 is provided by the seal ring 54 carried by a cylindrical portion 56 on the inner member 24 and bearing against the inner surface of an internal annular portion 58 of the outer member 32. By this arrangement the annular space surrounding the hub portion 36 of the outer member, between the annular portion 30 of the inner clutch member 24 and the end wall 38 of the outer clutch member, constitutes an expansion chamber for the clutch operating fluid so that fluid under pressure in this chamber will move the inner clutch member 24 relative to the outer clutch member to bring the beveled outer surface of the inner clutch member in contact with the friction material 60 carried internally by the rim portion 34 of the outer clutch member.

Fluid under pressure for operating the clutch is led to a chamber 62 in the supporting casing at the left hand end of the shaft 22 as viewed in Fig. 1, and from this chamber flows into the interior of the shaft to a bore 64 within which is disposed a reciprocable valve plug 66. The space within the hollow shaft 22 to the right of the plug 66, as viewed in Fig. 1, is filled at all times during engine operation with lubricating fluid at a pressure somewhat below the pressure of the fluid admitted to the chamber 62 so that, if the chamber 62 is connected with drain, the plug is moved to the position illustrated in Fig. 1 in which it cuts off the channels, one of which is indicated at 68, leading from the bore 64 to the clutch operating chamber. When pressure fluid is admitted to the chamber 62, however, the plug 66 is moved to the right, as viewed in Fig. 1, and the fluid under pressure flows through the channel 68 to the interior of the clutch to move the inner clutch member into engagement with the friction material 60. In the arrangement illustrated, the reciprocable plug 66 is mounted in a plug 70 rigidly secured in the end of the hollow shaft 22 and provided with channels, as indicated at 72, for supplying lubricating fluid to the clutch bearings.

The inner clutch member 24 is resiliently urged in a direction to disengage the clutch by the compression spring 74 which acts between the relatively fixed member 44 as one abutment and an abutment 75 formed on the inner clutch member.

The fluid chamber is relatively narrow thus requiring a relatively small volume of hydraulic fluid to fill the clutch and thereby limiting the amount of sludge or sediment introduced into the interior of the clutch. The sides of this chamber also slope smoothly radially outward providing no place within the clutch chamber where sludge or sediment can collect. The sludge, which is heavier than the hydraulic fluid, is thus constrained by centrifugal force incident to the rapid rotation of the clutch, to pass radially outwardly through the clutch chamber and collect in the radial pockets 76 from which it is discharged through the radial apertures 78 provided in the peripheral portion of the outer clutch member at the apices of the various pockets 76. As is particularly shown in Fig. 2, there are a relatively large number of radial pockets 76, ten being shown in the arrangement illustrated. This relatively large number of pockets provides that each pocket has a relatively narrow inner end and that the side walls of the pockets can thus be made radially steep without requiring an unduly large radial dimension for the outer clutch member between the open ends of the pockets and the apices thereof. Each pocket is provided at or near its apex with a sludge eliminating aperture leading to the exterior of the clutch and an arrangement utilizing ten sludge eliminating pockets will consequently require ten apertures leading from the apices of the pockets to the exterior of the outer clutch member. As these apertures have to be large enough so that they will not become choked or blocked by sludge or sediment passing therethrough, it is obvious that the clutch would pass a large quantity of fluid if all of these apertures were open all of the time. In order to reduce the quantity of oil passed, an annular ring 80 is mounted in a groove in the outer clutch member overlying the outer ends of the apertures 78 so that the ring covers all of the apertures in a manner to substantially prevent the flow of fluid through the apertures. The ring itself is provided with one or more radial apertures, as indicated at 82, which will register with corresponding apertures 78 at various positions of the ring. This ring is provided with peripheral gear teeth 84 which mesh with the teeth of the gear 14 but the ring has a different number of teeth than the gear 42 so that, as the gear 42 and toothed ring 80 rotate with the gear 14, the toothed ring will also rotate relative to the gear 42 and the outer clutch member. As a relatively slow rotation of the ring relative to the outer clutch member is sufficient the difference between the number of teeth on the ring and the number of teeth of the gear 42 can be relatively small, one ring tooth more or less than the number of teeth in the gear 42 having been found sufficient to provide an adequate speed of the ring relative to the outer clutch member. If more than one aperture 82 is provided in the ring, these preferably may be so spaced that only one of the apertures 78 will be uncovered at a time, as is particularly illustrated in Fig. 2 in which the top aperture 78 of the outer clutch member and the top aperture 82 of the ring are shown in registry. In this figure, nine equally spaced apertures 82 are shown in the ring 80 so that the apertures 78 are successively opened. As the ring 80 rotates in the groove in the outer clutch member the apertures 78 are uncovered in a predetermined order for an interval depending upon the circumferential extent of the apertures and the relative speed of rotation of the ring, the intervals being sufficient to permit the complete discharge of sludge or sediment from the corresponding radial pockets in the outer clutch member.

While a suitable mechanical embodiment has been hereinabove described and illustrated in the accompanying drawings for the purpose of disclosing the invention, it is to be understood that the invention is not limited to the particular arrangement so illustrated and described, but such changes in the size, shape and arrangement of the various parts may be resorted to as come within the scope of the sub-joined claims.

Having now described the invention so that others skilled in the art may clearly understand the same, when it is desired to secure by Letters Patent is as follows:

1. Means for eliminating sludge from a hollow oil containing rotatable member comprising, a plurality of depressions located around the periphery of the inside of said hollow member for collecting said sludge, each depression having an aperture leading therefrom to the exterior of said member, mechanism covering said apertures and preventing oil flow therethrough, and means for moving said mechanism relative to said hollow member to periodically uncover individual apertures to allow oil and sludge to flow momentarily therethrough.

2. Means for eliminating sludge from a hollow oil containing rotatable member comprising, a plurality of depressions located around the periphery of the inside of said hollow member for collecting said sludge, said depressions having apertures leading therefrom to the exterior of said member, mechanism normally covering said apertures and preventing oil flow therethrough, and means for continuously moving said mechanism relative to said hollow member to momentarily uncover individual apertures.

3. Means for eliminating sludge from a hollow oil containing rotatable member comprising a plurality of depressions located around the periphery of the inside of said hollow member for collecting said sludge, each of said depressions having an aperture leading therefrom to the exterior of said member, mechanism constituting closures for each of said apertures, and means to rotate said mechanism relative to said hollow member for periodically opening said apertures.

4. Means for eliminating sludge from a hollow oil containing rotatable member comprising, a plurality of depressions located around the periphery of the inside of said hollow member for collecting said sludge, said depressions having apertures leading therefrom to the exterior of said member, mechanism constituting closures for each of said apertures, and means for periodically opening said closures momentarily one at a time.

5. In combination with a rotatable liquid actuated device having telescoping parts defining an expansible liquid receptacle, a desludging mechanism comprising, means rotatable with one part of said device and defining an annular chamber having radially extending pockets in communication with said liquid receptacle, a port leading from each pocket to the exterior of said device, and a device carried by said liquid actuated device in alignment with said ports and movable relative to said liquid actuated device to control the opening of said ports.

6. In combination with a rotatable liquid actuated device having telescoping parts defining an expansible liquid receptacle, a desludging mechanism comprising, means rotatable with one part of said device and defining an annular chamber having radially extending pockets in communication with said liquid receptacle, a port leading from each pocket to the exterior of said device, said ports being disposed in circumferential alignment around said device, and an annular member carried by said device overlying said ports, said annular member being rotatable relative to said device and having at least one opening therein registerable with said ports in sequence to open said ports.

7. In a fluid operated friction clutch having an expansible chamber into which fluid under pressure is fed for forcing the driving and driven parts of said clutch into frictional engagement, a plurality of radially extending pockets in said clutch communicating with said chamber to receive sediment from the fluid fed into said chamber, an aperture leading from each pocket to the exterior of said clutch, and a member overlying said apertures and movable relative to said clutch and having an opening therein registerable with said apertures in sequence to open said apertures in a predetermined order.

8. In a fluid operated friction clutch having an expansible chamber into which fluid under pressure is fed for forcing the driving and driven parts of said clutch into frictional engagement, a plurality of radially extending pockets in said clutch communicating with said chamber to collect sediment from the fluid fed into said chamber, an aperture leading from each pocket to the exterior of said clutch, said clutch having an external groove therein in the portion thereof through which said apertures extend, and an annular member in said grooves rotatable relative to said clutch, and at least one opening in said annular member registerable with said apertures in sequence.

9. In a fluid operated friction clutch having an expansible chamber into which fluid under pressure is fed for forcing the driving and driven parts of said clutch into frictional engagement, a plurality of radially extending pockets in said clutch communicating with said chamber to receive sediment from the fluid fed into said chamber, an aperture leading from each pocket to the exterior of said clutch, the total area of said apertures being greater than the permissible leakage area from said clutch, and a member carried by said clutch covering said apertures, said member being movable relative to said clutch and having an opening for periodically uncovering said apertures.

10. In a fluid operated friction clutch having a driven part provided with peripherial gear teeth engageable with the teeth of a clutch driven spur gear, and a driving part telescopically associated with said driven part to provide between said parts an expansible chamber into which fluid under pressure is fed for forcing the driving and driven parts of said clutch into frictional engagement, a plurality of radially extending pockets in said clutch communicating with said expansible chamber to receive sediment from the fluid fed into said chamber, said clutch having apertures leading one from each pocket to the exterior of said clutch, the combined area of said apertures being greater than the permissible leakage area from said clutch, and a member mounted on said clutch covering said apertures, said member having gear teeth meshing with the teeth of said clutch driven gear for rotating said member relative to said clutch and at least one opening for uncovering said apertures in sequence.

11. The arrangement as set forth in claim 10 in which the gear ratio between said clutch driven gears and the driven part of said clutch is different from the gear ratio between said gear and said clutch carried member.

12. The arrangement as set forth in claim 10 in which said clutch carried member has a number of gear teeth different from the number of gear teeth on the driven part of said clutch.

GUY E. BEARDSLEY, Jr.